Dec. 13, 1938.   W. H. SILVER   2,140,144
AGRICULTURAL IMPLEMENT
Filed Feb. 23, 1937   3 Sheets-Sheet 1
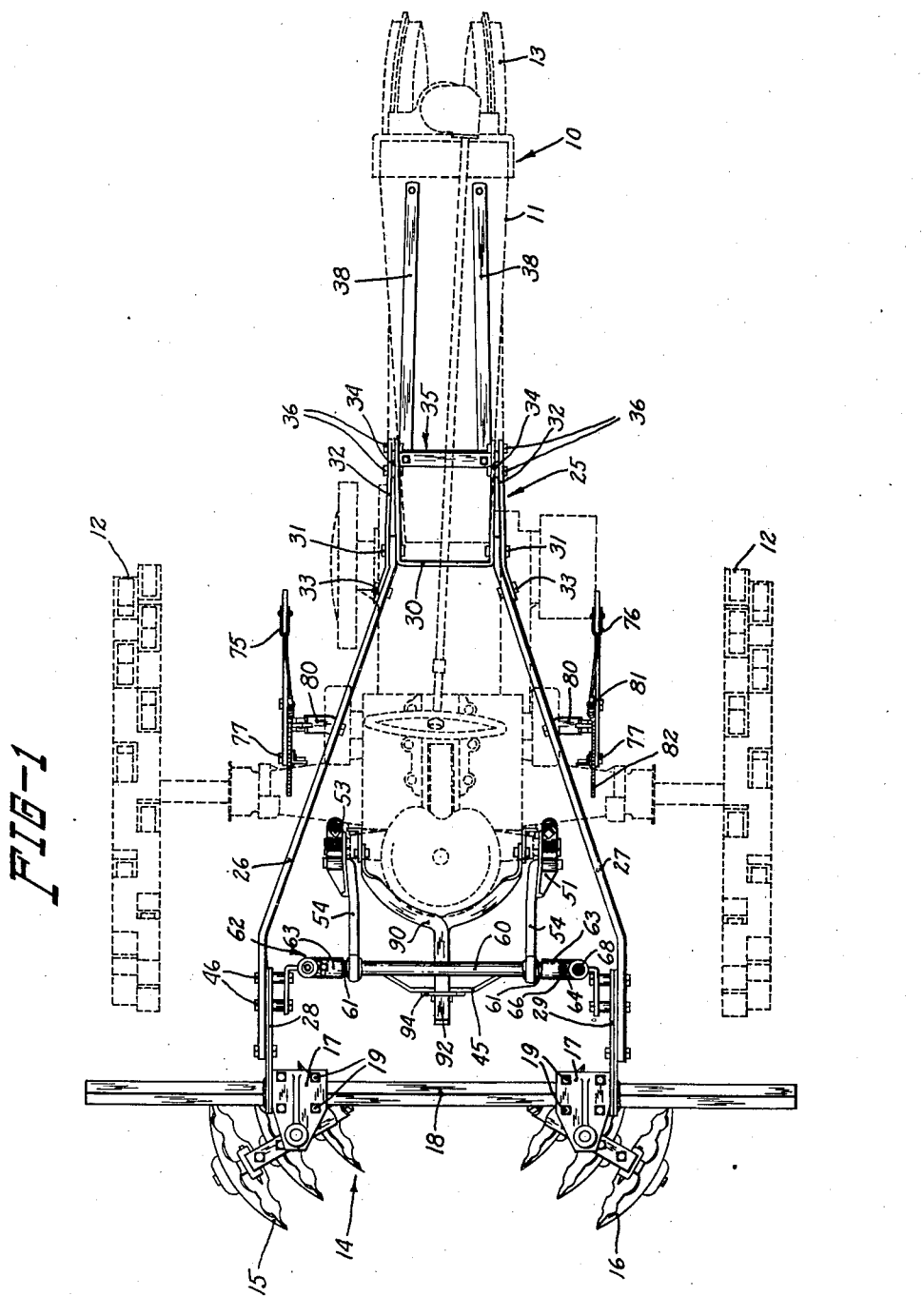
INVENTOR
WALTER H. SILVER
BY
ATTORNEY

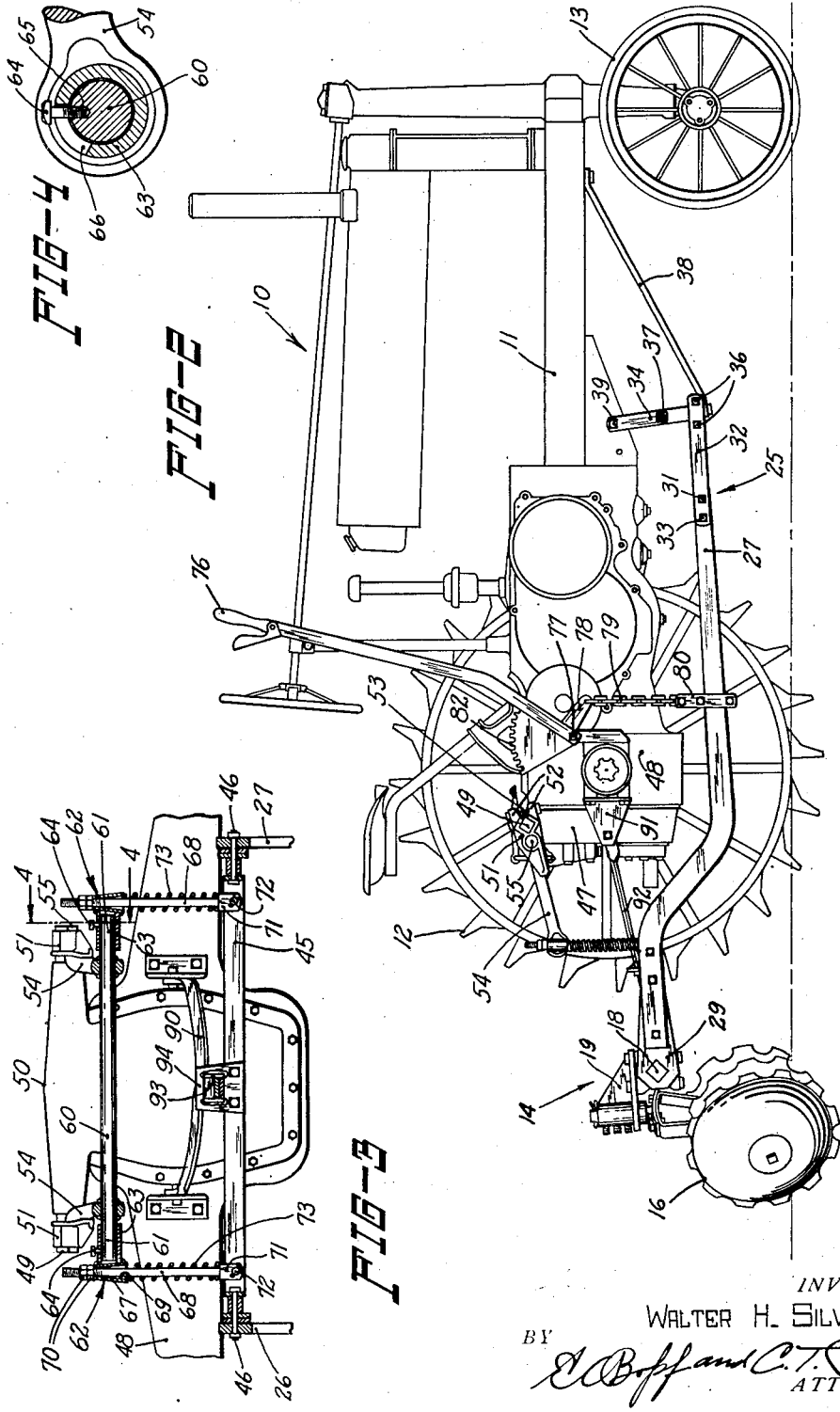

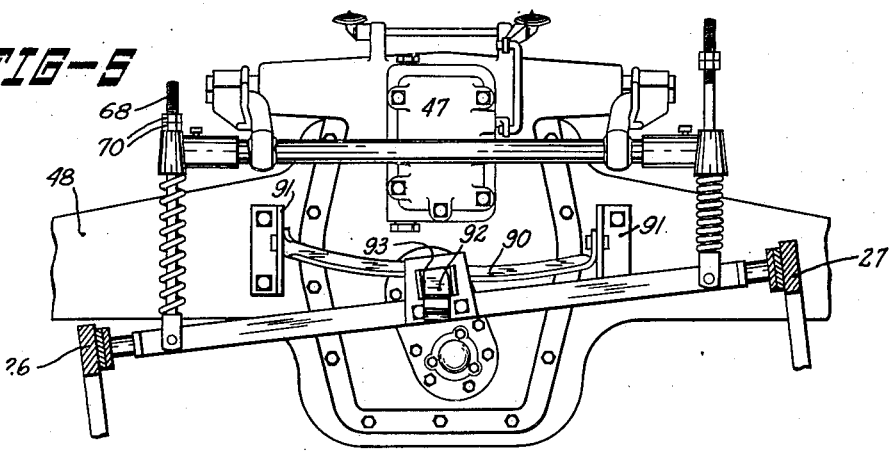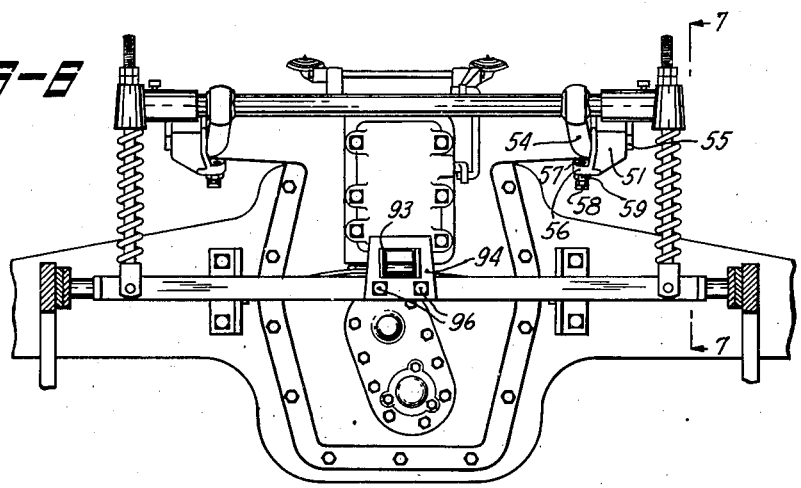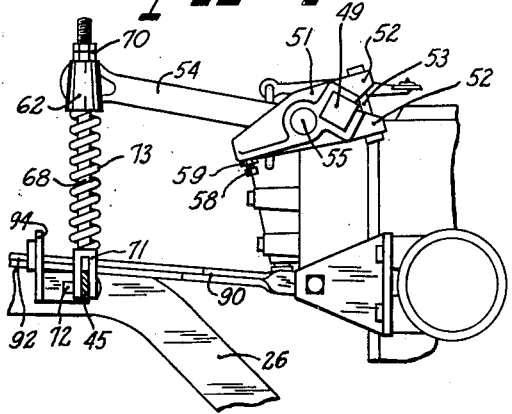

Patented Dec. 13, 1938

2,140,144

UNITED STATES PATENT OFFICE 2,140,144

AGRICULTURAL IMPLEMENT

Walter H. Silver, Moline, Ill., assignor to Deere & Company, Moline, Ill., a corporation of Illinois Application February 23, 1937, Serial No. 126,956

17 Claims. (Cl. 97—47)

The present invention relates generally to agricultural implements and more particularly to lifting and equalizing connections for implements of the tractor mounted type having a draft frame extending forwardly from ground working tools behind the tractor to draft connections beneath the tractor near the forward end thereof, the frame being vertically swingable to raise and lower the tools from ground working position to transport position, and vice versa.

My invention has its greatest application to certain disc implements such as bedders which are used for the purpose of working the soil into longitudinally extending, laterally spaced ridges or beds separated by shallow ditches. This method is employed in raising vegetables such as beans, tomatoes, etc., in regions which receive a substantial amount of moisture. A bedder comprises a pair of laterally spaced opposed gangs of discs adapted either to throw up a bed of soil between them or to dig out a ditch, depending on the relative positions of the discs.

Since there is no suction, or tendency for the discs to hold themselves in the ground, they must depend on their weight alone to maintain themselves at proper working depth. Hence, for a given weight of implement, the depth of operation is largely dependent on the hardness of the soil.

It is desirable in bedding operations, however, that both gangs of discs dig to the same depth in order to obtain uniform beds. When, for example, one of the gangs encounters a clod or a patch of hard soil, it is desirable that extra pressure be exerted on that gang to prevent it from rising out of the ground. Although it has been previously suggested to accomplish this result by means of springs which act downwardly upon each tool beam and which react upwardly upon the tractor itself, there are certain disadvantages attendant with such arrangement. For example, if a large patch of stony ground were encountered, both tools would be forced out of the ground simultaneously against the pressure of both springs which would introduce the danger of cracking the edges of the discs or at least dulling them badly. Another disadvantage of such arrangement is that the vertical movement of the tractor over uneven ground causes an undesirable variation in pressure on the discs. It is desirable therefore, that the tool beams be free to move vertically in unison relative to the tractor, without imposing extra pressure upon them.

The principal object of this invention therefore, is concerned with the provision of equalizing connections between the gangs which allow free floating vertical movement of the gangs in unison but which cause an increased downward pressure to be imposed on one of the gangs when it rises relative to the other gang.

A further object has to do with the provision of connections between the equalizing connection and the tractor power lift mechanism whereby the implement can be raised to transport position by means acting through the equalizing connections but without interfering with the operation of the equalizing connections during ground working operation.

Another object has to do with providing connections between the implement and the tractor which, while tending to maintain the implement frame generally parallel to the frame of the tractor but not rigidly so, in order to minimize the effect upon the implement of lateral tilting of the tractor.

Still another object relates to the provision of jointed crank arms for the power lift rock shaft of a tractor, which transmit rotative movement of the shaft to lift an implement connected thereto, while permitting unrestricted upward swinging of the implement during ground engaging operation while the power lift rock shaft remains in normal inoperative position.

These and other objects will be made apparent by a consideration of the following detailed description of a device embodying principles of my invention, reference being had to the drawings appended hereto, in which—

Figure 1 is a plan view of a bedder disposed in normal operating position relative to a tractor, the latter being outlined in dotted lines;

Figure 2 is a side elevation of a tractor equipped with a bedder, the rear wheel of the tractor being removed to more clearly disclose the lifting and equalizing connections;

Figure 3 is a partial rear elevation of the tractor showing the lifting and equalizing connections in the lowered position of the implement;

Figure 4 is a sectional view taken along a line 4—4 in Figure 3, showing one of the hanger brackets;

Figure 5 is a partial rear elevation showing the lifting and equalizing connections in the position assumed when one side of the implement frame rises relative to the tractor, as one gang rides over an obstruction;

Figure 6 is a view similar to Figure 5 but showing the relative positions of the parts as both gangs rise out of the ground as when encountering a patch of hard soil or rock; and Figure 7 is a partial side elevation taken along a line 7—7 in Figure 6.

Referring now to the drawings and more particularly to Figures 1 to 3, reference numeral 10 indicates a tractor of the general purpose agricultural type comprising a horizontally disposed frame 11 carried on rear driving wheels 12 and a dirigible dual front wheel assembly 13. Mounted on the tractor is an agricultural implement 14 of the disc type known as a bedder, comprising a pair of laterally spaced disc gangs 15, 16 disposed behind the tractor 10, each gang being attached to a bracket 17 which is clamped to a transversely extending tool bar 18. Each of the disc gangs 15, 16 comprises a set of three coaxially assembled discs, the two gangs being disposed in opposition and adapted to throw up a ridge or bed of soil between them. By loosening the clamping bolts 19 which fix the brackets 17 on the bar 18, the lateral spacing of the gangs can be adjusted for adjusting the width of the bed. The tool bar 18 is connected to the tractor by a draft frame 25 which comprises a pair of longitudinally extending draft beams 26, 27 disposed beneath the tractor and bolted to a pair of laterally spaced brackets 28, 29, respectively, which are welded to the tool bar 18. The draft beams 26, 27 extend forwardly in converging relation and are swingably connected to the tractor substantially midway between the front and rear wheels thereof by means of a U-shaped member 30 connected by bolts 31 between the forward ends of the draft beams and a pair of strap members 32 bolted on the outer sides of the forward ends of the beams 26, 27 by bolts 31, 33. Each of the bars 32 extends parallel to but spaced laterally from one of the legs of the U-shaped member 30, and are spaced laterally therefrom to receive slidably between them the upwardly extending arms 34 of a vertically disposed U-shaped strap member 35. The upper ends of the arms 34 are bolted to opposite sides of the tractor body by bolts 39. The arms 34 are retained between the connecting members 30 and 32 by bolts 36 inserted through aligned holes in the strap members 30, 32 on each side of each of the arms 34. The strap members 30 and 32 are free to slide upwardly to an upper stop comprising a bolt 37 in each of the arms 34 of the member 35. By virtue of this sliding connection the frame 25 is provided with a limited freedom to tilt laterally and also to swing the tool bar vertically to raise and lower the disc gangs between operative and inoperative or transport positions. A pair of forwardly extending draft braces 38 are connected to the member 35 and bolted at their forward ends to the frame 11 of the tractor.

The rear end of the draft frame 25 is braced by a transversely extending member 45 connected to each of the draft beams 26, 27 by bolts 46. This transverse brace 45 also provides a means for connecting the frame to the power lift mechanism of the tractor. The power lift mechanism 47 is of a conventional form of the type which is disposed at the rear of the axle housing 48 of the tractor and includes a transversely extending rock shaft 49 journaled in a housing 50 and extending laterally out of each side thereof. On each end of the power lift rock shaft 49 is fixed a lifting arm 51 having a pair of clamping members 52 which embrace the rock shaft 49 and are clamped by a bolt 53 as best shown in Figure 7. The lifting arms 51 are disposed parallel to each other and extend rearwardly from the rock shaft. Each of the lifting arms is provided with an extension arm 54 disposed parallel to the lifting arm. The inner or forward end of each of the extension arms 54 has a transversely bent portion 55 which is journaled in the lifting arm 51 at a point closely adjacent to the rock shaft 49. The outer or rearward end of the lifting arm 51 is provided with an offset lug 56, as best illustrated in Figure 6. This lug extends laterally under the extension arm 54 and is provided with a threaded aperture 57 which receives a bolt 58, which provides an adjustable limit for downward swinging movement of the extension arm. The bolt 58 is fixed in adjusted position by means of a lock nut 59. Hence, each of the arms 54 is free to swing upwardly relative to the lifting arm 51 when the latter is in its normal lowered position, as shown in Figure 7, but when the power lift rock shaft 49 is rotated in clockwise direction, as viewed in Figures 2 and 7, the stop bolt 58 engages the arm 54, causing it to swing in unison with the lifting arm 51.

The rearward ends of the extension arms 54 are apertured to receive a transversely disposed lifting bar 60 to which each of the arms 54 is rigidly fixed as by welding, to provide a unitary rigid U-shaped structure, which is swingable vertically about the axis of the outwardly turned ends 55 of the extension arms 54. The bar 60 has a lateral extension 61 outwardly of each of the arms 54. Each of the extensions 61 supports a bracket 62 having a horizontally disposed sleeve portion 63 journaled on the bar extension 61, and secured thereon by a bolt 64 which is retained within a threaded opening 65 in the bar 60, as best shown in Figure 4. The bolt 64 extends through a slot 66 in the sleeve portion 63 to allow a limited amount of angular movement of the bracket relative to the bar 60. Each of the brackets is provided with a vertically extending sleeve portion 67 disposed outwardly of the end of the bar 60 and is adapted to receive a vertically disposed rod 68. The bore 69 of the sleeve 67 is tapered outwardly and downwardly to permit the vertical rod or hanger 68 a limited amount of freedom to swing within the bore. The hanger 68 is suspended from the bracket 62 by a pair of lock nuts 70 which are disposed on the upper thread end of the hanger and engage the upper end of the vertical sleeve portion 67. The lower end of each hanger 68 is provided with a shackle 71 rigidly attached thereto and which straddles the transverse brace bar 45 of the draft frame 25. Each of the shackles 71 is fastened to the bar 45 by a pin 72 inserted through aligned openings in the bar and shackles. Upward thrust is transmitted from the draft frame 25 to the transverse bar 60 through a pair of coil springs 73, encircling the hanger 68, respectively. Each of the springs 73 bears against its respective shackle 71 at the lower end and against the bracket 62 at the upper end.

The level of the frame 25 relative to the tractor can be adjusted by means of either the nuts 70 for raising or lowering one of the hangers 68, or the stop bolts 58 on the arms 51, which adjust the level of the lifting bar 60. The depth of ground engagement of the discs 16 depends upon the weight of the implement and the hardness of the soil, but is limited in extent by the length of the hangers 68 below the arms 54, and in addition a depth adjustment can be effected by means of a pair of hand levers 75, 76 pivotally connected to the axle housing 48 of the tractor by means of bolts 77. Each lever has a crank arm 78 which is connected to the respective draft beam 26, 27 by means of a chain 79 and a bracket 80. Each lever is held in adjusted position by a latch 81 engaging a notched quadrant 82.

The operation of the implement is as follows: Normally the weight of the implement is carried by the discs. The frame 25 floats along while irregularities are compensated for by the extension arms oscillating vertically relative to the lifting arms 51. When both discs encounter a patch of rock or hard soil, or when the tractor drops into a hollow ahead of the disc gangs, the draft frame 25 moves upwardly relative to the tractor frame without lateral tilting, thereby swinging the unitary structure, comprising the bar 60 and the arm extensions 54, upwardly about the axis of the outwardly turned ends 55 of the arm extensions, to the position shown in Figures 6 and 7. The springs 73 are not compressed in this case since the only resistance to the upward movement of the hangers 68 is that due to the weight of the bar 60 and the brackets 62. The downward pressure against the disc gangs 15, 16, is not increased, since this pressure is only that due to the weight of the implement itself. Hence, the depth of operation of the discs is not varied by reason of the tractor dropping into a hollow ahead of the discs, as long as the frame of the tractor does not tilt laterally relative to the frame of the implement.

However, when one of the discs encounters a clod of earth or other obstruction and begins to ride over the obstruction, the draft frame 25 is thereby tilted into a position such as the one illustrated in Figure 5. This tilting action causes the spring 73 adjacent to the higher draft beam 27, to be compressed between its shackle 71 and bracket 62, thereby exerting an upward thrust against the bar 60, which thrust is transmitted to the hanger 68 adjacent the lower draft beam 26. Thus the higher draft beam 27 receives an extra pressure due to the compression of the spring 73 while the lower draft beam 26 is lifted through its respective hanger 68. In other words, a portion of the weight of the lower draft beam 26 is shifted to the raised draft beam 27 and the increased weight facilitates breaking of the clod of hard soil or other obstruction and tends to reestablish the draft frame 25 parallel to the lifting bar 60. During this tilting movement, however, none of the weight of the tractor is imposed upon the disc gangs since the arm extensions 54 are at all times free to swing upwardly relative to the lifting arm 51.

The implement frame 25 is at all times prevented from swinging laterally and fouling one of the driving wheels 12 of the tractor, by means of a bail member 90 pivoted for vertical swinging on a pair of laterally spaced brackets 91 attached to the rear of the axle housing 48. The bail 90 has a centrally disposed rearwardly extending tongue 92 which is slidably disposed within an aperture 93 in a plate 94 connected to the transverse bracing member 45 by bolts 96. Hence, the bail, by its engagement with the draft frame 25 of the implement prevents lateral swinging of the latter, but does not affect the vertical movement of the draft frame relative to the tractor.

I claim:

1. In combination with a tractor, a tool carrying frame comprising a pair of longitudinally extending beams and fore and aft cross members connected therebetween, said frame extending forwardly under the tractor to draft connections therewith, said connections providing vertical swinging and a limited amount of lateral tilting of said frame relative to the tractor, said frame extending rearwardly to laterally spaced ground working tools disposed behind said tractor, a pair of laterally spaced arms carried on said tractor and freely swingable about a transversely extending axis during ground working operation, means for rigidly interconnecting said arms to form a unitary structure, a pair of vertically disposed hangers carried by said arms and connected to said frame, and resilient means for applying a downwardly acting force against the higher side of said frame when the latter tilts laterally relative to said tractor, the reaction to said force being applied through said unitary structure to raise the lower side of said frame.

2. In combination with a tractor, a tool carrying frame comprising a pair of longitudinally extending beams and fore and aft cross members connected therebetween, said frame extending forwardly under the tractor to draft connections therewith, said connections providing vertical swinging and a limited amount of lateral tilting of said frame relative to the tractor, said frame extending rearwardly to laterally spaced ground working tools disposed behind said tractor, power lift mechanism carried on said tractor including a transversely disposed rock shaft and a pair of laterally spaced arms carried thereon, said arms being adapted to swing upwardly with rotation of said rock shaft and being unrestricted against upward swinging during ground working operation, a transversely disposed bar supported on said arms, a vertical hanger suspended at each end of said bar but movable upwardly relative thereto, means for connecting said hangers to said frame for lifting the latter by rocking said rock shaft, and spring means associated with each of said hangers for resisting tilting of said tool frame relative to said bar but permitting unrestricted vertical swinging of said frame.

3. In combination with a tractor, a tool carrying frame comprising a pair of longitudinally extending beams and fore and aft cross members connected therebetween, said frame extending forwardly under the tractor to draft connections therewith, said connections providing vertical swinging and a limited amount of lateral tilting of said frame relative to the tractor, said frame extending rearwardly to laterally spaced ground working tools disposed behind said tractor, power lift mechanism carried on said tractor including a transversely disposed rock shaft and a pair of laterally spaced arms carried thereby, said arms being adapted to swing upwardly with rotation of said rock shaft and being unrestricted against upward swinging during ground working operation, a transversely disposed bar supported on said arms, a vertical hanger suspended at each end of said bar but movable upwardly relative thereto, means for connecting said hangers to said frame for lifting the latter by rocking said rock shaft, spring means associated with each of said hangers for resisting tilting of said tool frame relative to said bar but permitting unrestricted vertical swinging of said frame, and means engaging the rear portion of said frame for restraining the frame against lateral swinging movement.

4. In combination with a tractor having power lift mechanism including a pair of laterally spaced rearwardly extending arms disposed at the rear of said tractor and actuated by said power lift mechanism to swing vertically, said arms being freely swingable when said power lift mechanism is inoperative, a transversely disposed bar rigidly connecting the free ends of said arms and having lateral extensions, a bracket journaled on each of said extensions, a rod suspended from each of said brackets and movable vertically relative thereto, tool carrying means attached to the lower ends of said rods, and a helical spring embracing each of said rods between said bracket and said tool carrying means.

5. In combination with a tractor having power lift mechanism including a rock shaft disposed transversely at the rear of said tractor, laterally spaced arms connected to said rock shaft and swingable vertically when said rock shaft is rotated, said arms being freely swingable when said power lift mechanism is inoperative, a bar for rigidly interconnecting the ends of said arms, laterally spaced brackets journaled on said bar, a vertically disposed rod carried on each of said brackets and movable vertically relative thereto, a tool carrying frame disposed beneath said tractor, at least a portion of said frame being supported on said rods, and a spring surrounding each of said rods and disposed between said bracket and said frame for resisting tilting of said frame relative to said bar.

6. In combination with a tractor having power lift mechanism including a rock shaft disposed transversely at the rear of said tractor, laterally spaced arms connected to said rock shaft and swingable vertically when said rock shaft is rotated, said arms being freely swingable when said power lift mechanism is inoperative, a bar for rigidly interconnecting the ends of said arms, laterally spaced brackets journaled on said bar, a vertically disposed rod carried on each of said brackets and movable vertically relative thereto, a tool carrying frame disposed beneath said tractor, at least a portion of said frame being supported on said rods, a spring surrounding each of said rods and disposed between said bracket and said frame for resisting tilting of said frame relative to said bar, and a vertically swingable member mounted on said tractor and engaging said tool frame for restraining the latter from lateral movement relative to said tractor.

7. In combination with a tractor having power lift mechanism including a horizontally disposed rock shaft and laterally spaced lifting arms rigidly fixed thereon and swingable vertically with rotation of said shaft, an arm pivotally connected to each of said lifting arms, a stop on each of said lifting arms to limit the pivotal movement in one direction of said pivotally connected arms relative to said lifting arms, a bar rigidly connected to the free ends of said pivoted arms, laterally spaced brackets supported on said bar, a hanger suspended from each of said brackets and movable vertically relative thereto, a tool carrying frame supported on said rods, and a helical spring embracing each of said rods, disposed between said bracket and said frame to resist tilting of said frame relative to said bar.

8. In combination with a tractor having power lift mechanism including a rock shaft, a lifting arm rigidly fixed on said shaft, an arm pivotally connected to said lifting arm, a stop on said lifting arm engageable with said pivoted arm to limit the pivotal movement of the latter in one direction, and means for adjusting the angular relation between said arms when the latter are in engaged position.

9. In combination with a tractor having a rock shaft, a lifting arm rigidly fixed to said shaft, an extension arm pivotally connected to the inner end of said lifting arm near said rock shaft but spaced therefrom, the outer end of said lifting arm being engageable with said extension arm to limit the pivotal movement of the latter in one direction.

10. In combination with a tractor, a rock shaft journaled thereon, a lifting arm fixed on said shaft, and a second arm adapted for swinging movement with respect to said lifting arm, said lifting arm being adapted to engage said second arm when said rock shaft is rocked to swing said lifting arm in one direction, and means for adjusting said second arm angularly relative to said lifting arm when the arms are in engaged position.

11. In combination with a tractor having power lift mechanism including an actuating rock shaft, a lifting arm disposed for swinging movement relative to said tractor responsive to rocking movement of said shaft, a second arm disposed for swinging movement relative to said lifting arm about an axis parallel to the axis of rotation of said lifting arm, and means for limiting swinging movement of one of said arms relative to the other of said arms in one direction of rotation.

12. In combination with a tractor having lifting mechanism including an actuating rock shaft, a pair of arms swingable about parallel horizontal axes, one of said arms being connected to said rock shaft, means for connecting the other of said arms to an implement associated with said tractor, said other arm being free to swing upwardly relative to the first said arm responsive to an upthrust by said implement, and means for engaging said second arm by said first arm for concurrent upward swinging movement responsive to a rotative movement of said rock shaft.

13. In combination with a tractor having power lift mechanism including a horizontally disposed actuating rock shaft, a pair of laterally spaced lifting arms fixed to said shaft, an extension arm pivoted to each of said lifting arms for vertical swinging movement with respect thereto, a tool carrying frame supported on said extension arms, and means for limiting the downward swinging of said extension arms relative to said lifting arms, said limit means comprising adjustable stops for varying the angular relation between the two extension arms for leveling said tool frame relative to the tractor.

14. In combination with a tractor having power lift mechanism including a pair of laterally spaced rearwardly extending arms disposed at the rear of said tractor and actuated by said power lift mechanism to swing vertically, said arms being freely swingable when said power lift mechanism is inoperative, a transversely disposed bar rigidly connecting said arms, a bracket journaled on said bar, a rod suspended from each of said brackets and movable vertically relative thereto, tool carrying means attached to the lower ends of said rods, and a helical spring embracing each of said rods between said bracket and said tool carrying means.

15. In combination with a tractor having power lift mechanism including an actuating rock shaft, a lifting arm disposed for swinging movement relative to said tractor responsive to rocking movement of said shaft, a second arm disposed for swinging movement relative to said lifting arm about an axis parallel to the axis of rotation of said lifting arm, and means for limiting swinging movement of one of said arms relative to the other of said arms in one direction of rotation, said limiting means being adjustable to adjust the angular relation between said arms.

16. In combination with a tractor having power lift mechanism including a rock shaft, a lifting arm rigidly fixed on said shaft, an arm pivotally connected to said lifting arm, and a stop on said lifting arm engageable with said pivoted arm to limit the pivotal movement of the latter in one direction, said stop being adjustable to adjust the angular relation between said arms in engaged position.

17. In combination with a wheel supported frame, a tool carrying frame having transversely spaced tools thereon and connections to said wheel supported frame, said connections providing vertical swinging and a limited amount of lateral tilting of said tool carrying frame relative to said wheel supported frame, a pair of laterally spaced arms carried on said wheel supported frame and freely swingable about a transversely extending axis during ground working operation, means for rigidly interconnecting said arms to form a unitary structure, a pair of hangers carried by said arms and connected to said tool carrying frame, and resilient means for applying a downwardly acting force against the higher side of said tool carrying frame when the latter tilts laterally relative to said wheel supported frame, the reaction to said force being applied through said unitary structure to raise the lower side of said tool carrying frame.

WALTER H. SILVER.